Oct. 21, 1930.

A. KILLANDER 1,779,255

REMOVABLE OVERFLOW DRAIN

Filed March 16, 1928

INVENTOR
Axel Killander
BY
Wm G. Blomstran.
ATTORNEY.

Patented Oct. 21, 1930

1,779,255

UNITED STATES PATENT OFFICE

AXEL KILLANDER, OF CHICAGO, ILLINOIS

REMOVABLE OVERFLOW DRAIN

Application filed March 16, 1928. Serial No. 262,212.

My invention relates more particularly to improvements in removable overflow drains that are generally to be used in connection with the drains in kitchen sinks.

The object of my improvements is, primarily, to do away with the use of the ordinary dish pan generally used by the housewife in washing dishes, etc.

The manner in which my invention is adapted to be used constitutes and includes the improvements as embodied in my invention. As, for instance, when my device is installed in a kitchen sink over the usual drain, the water, hot or cold as desired, is turned on and allowed to fill the sink until the top of my drain is reached. Then the person about to wash the dishes can proceed without the necessity of using the usual dish pin. And, as she washes, she can immediately rinse each individual piece, by simply holding it under the hot water faucet and letting the water run without danger of overflowing the sink. And, at the same time, the grease, from the dishes, floating on the surface of the water in the sink, will be flushed away by the hot rinsing water.

While, primarily, my invention is intended to be a substitute for the ordinary dish pan, it also may be used, in another form, as an overflow orifice in chemical tanks, or in other places, where it is desired to measure off a liquid in certain quantities. It also may be used in connection with keeping articles cool under running water retained by it in the sink.

The objects of my improvements will be more fully outlined in the several illustrations of the accompanying drawings and more fully described in the following specification, and more particularly pointed out in the appended claims.

In the several views illustrated in the accompanying drawings is presented the improvements as embodied in my invention.

Similar characters refer to similar parts throughout the several views.

Figure 1:
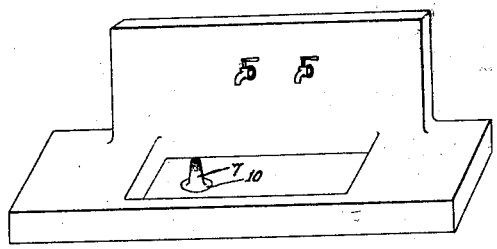
Fig. 1, is a perspective view of a type of kitchen sink in which is shown my invention placed over and concealing the ordinary sink drain.
Figure 3:
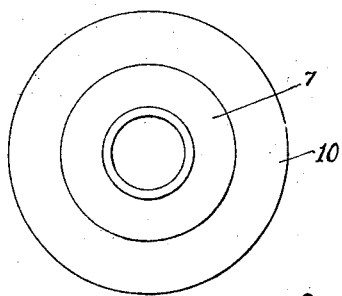
Fig. 3, is a plan view of my invention as shown in Figures 1 and 2.
Figure 2:
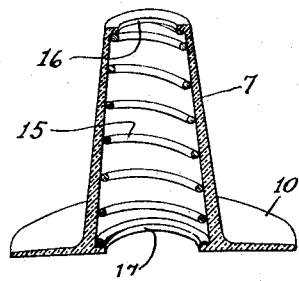
Fig. 2, is a longitudinal sectional view of my invention shown in perspective, and shows a coil spring in the opening through the overflow drain.

Referring to the several views, particularly to Figures 1, 2, and 3, it will be seen that my overflow drain, 7, is of the form of a flanged truncated cone having a conical portion, 7; the base of the said conical portion terminating into a flat circular flange, 10.

Referring to Fig. 2, it will be seen that a conically coiled spring, 15, is inserted between an upper internal flange, 16, and a lower internal flange, 17, and the outside diameters of the said spring fits the internal contour of the truncated conical portion, 7.

The reason of the said spring, is to prevent the conical portion of the said drains from collapsing against heavy pressures when used in enclosed tanks, or reservoirs, which may be under very heavy pressures.

The overflow drains may be made of most any material, but for househod use, they are preferably made of a rubber composition.

When the overflow drain, embodying my improvements, is placed over the sink drain, or the outlet of a tank, or reservoir, and the same are filled, or partly filled, with a liquid, the external pressure of the liquid against the outside of the said drains will be sufficient to hold them securely in place over the outlet at which they were placed.

Having thus described my invention it can be readily understood that the minor details of my construction may be altered in several ways without departing from the spirit of my invention, therefore, what I claim and desire to secure by Letters Patent is—

1. The combination in removable overflow drains of the class set forth, of a flat circular flanged hollow truncated cone forming an elevated inlet orifice and a lower outlet orifice, and means to support a conical spring between said orifices and against the internal wall of said cone, substantially as described and for the purpose specified.

2. The combination in removable overflow drains of the class set forth, of a flat circular flanged hollow truncated cone forming an elevated inlet orifice and a lower outlet orifice, internal means for supporting a conical spring between said orifices, to prevent abnormal external pressures from collapsing said cone, and means within the said cone whereby the internal hydraulic pressures cooperate with the external hydraulic pressures to avoid displacement of said outlet orifice with respect to that of the overflow outlet in the bottom of a sink or container, substantially for the purpose specified.

3. The combination in removable overflow drains of the class set forth, of a conical orifice forming a truncated cone, a substantially flat circular flange joining the said cone at its base and forming a lower flanged outlet orifice, an internal flange formed in the upper end of the said cone, and said flanges being adapted to support a conically coiled spring there-between and against the inner wall of said cone, to support the sides of said cone against heavy external pressures, substantially as described and for the purpose specified.

4. The combination in removable overflow drains of the class set forth, of a flat horizontal circular flanged hollow truncated cone, an elevated orifice formed by a flange in the upper end of said truncated cone, an outlet orifice formed in the flanged base at the base of said cone, and said flanges being adapted to support a conically coiled spring there-between and against the inner wall of said cone, substantially as described and for the purpose specified.

5. The combination in removable overflow drains of the class set forth, of an inwardly and outwardly flanged hollow truncated cone forming an elevated inlet orifice, a substantially flat circular flange joining the base of said cone and forming a lower outlet orifice and a support for said cone, and the walls of said cone forming a conical outlet opening and joining said orifices in the manner substantially as described and for the purpose specified.

AXEL KILLANDER.